(12) United States Patent
Favre-Felix et al.

(10) Patent No.: US 11,442,632 B2
(45) Date of Patent: Sep. 13, 2022

(54) REBALANCING OF USER ACCOUNTS AMONG PARTITIONS OF A STORAGE SERVICE

(71) Applicant: Apple Inc., Cupertino, CA (US)

(72) Inventors: Nicolas A. Favre-Felix, San Francisco, CA (US); Alexander Shraer, Kirkland, WA (US); Ori Herrnstadt, Los Altos Hills, CA (US); Nathan L. Williams, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/137,372

(22) Filed: Sep. 20, 2018

(65) Prior Publication Data

US 2019/0303021 A1 Oct. 3, 2019

Related U.S. Application Data

(60) Provisional application No. 62/651,675, filed on Apr. 2, 2018.

(51) Int. Cl.
*G06F 3/06* (2006.01)

(52) U.S. Cl.
CPC .......... *G06F 3/0617* (2013.01); *G06F 3/0659* (2013.01); *G06F 3/0673* (2013.01)

(58) Field of Classification Search
CPC ..... G06F 3/0617; G06F 3/0659; G06F 3/0673
USPC .......................................... 711/158
See application file for complete search history.

(56) References Cited

U.S. PATENT DOCUMENTS

| 7,957,359 | B1 * | 6/2011 | Robson ................ H04W 16/12 455/450 |
| 8,302,100 | B2 | 10/2012 | Deng et al. |
| 9,253,253 | B1 | 2/2016 | Bhattacharyya et al. |
| 9,384,061 | B1 * | 7/2016 | Deivanayagam ..... G06F 9/5083 |
| 9,411,653 | B2 | 8/2016 | Trammel et al. |
| 9,420,034 | B2 * | 8/2016 | Cai ........................ H04L 67/10 |
| 2007/0101022 | A1 * | 5/2007 | Schulz .................. G06F 16/958 707/E17.116 |
| 2012/0303791 | A1 * | 11/2012 | Calder .................. G06F 9/5083 709/224 |
| 2016/0226963 | A1 * | 8/2016 | Forsberg ................. G06F 9/00 |
| 2016/0306881 | A1 * | 10/2016 | Chen ..................... H04L 67/22 |
| 2017/0024684 | A1 * | 1/2017 | Prangley ................. G09B 5/00 |
| 2017/0199770 | A1 * | 7/2017 | Peteva .................. G06F 9/5088 |

(Continued)

*Primary Examiner* — Sanjiv Shah
*Assistant Examiner* — Edward Waddy, Jr.
(74) *Attorney, Agent, or Firm* — Dickinson Wright RLLP

(57) ABSTRACT

This application relates to load balancing for a number of partitions of a network-based storage service. Each partition includes a number of server devices and/or network devices located in a data center and configured to provide access to storage resources hosted within the data center. User accounts are assigned to a particular partition such that requests related to a particular user account are routed to that partition. Periodically, a load balancing algorithm is executed to re-assign user accounts to different partitions to rebalance resource consumption across the different partitions. The load balancing algorithm can balance resource consumption for any number of resource types by generating a vector of resource utilization parameters for each user account, sorting the plurality of user accounts into clusters based on the vectors, and mapping at least some user accounts to different partitions.

20 Claims, 10 Drawing Sheets

(56) References Cited

U.S. PATENT DOCUMENTS

2017/0318083 A1* 11/2017 Ignatyev ............. H04L 43/0876
2017/0358346 A1* 12/2017 Zhang ................. G11C 16/349
2018/0101537 A1* 4/2018 Govindarajan ... G06F 16/24578
2018/0364949 A1* 12/2018 Aston ................... G06F 3/0661

* cited by examiner

| Entry ID 310 | User ID 320 | Tenant ID 330 | Metadata 340 |
|---|---|---|---|
| 001 | User_001 | T_002 | User Data Reference |
| 002 | User_003 | T_004 | User Data Reference |
| 003 | User_005 | T_001 | User Data Reference |
| 004 | User_001 | T_002 | User Data Reference |
| 005 | User_002 | T_001 | User Data Reference |
| 006 | User_001 | T_002 | User Data Reference |
| 007 | User_001 | T_003 | User Data Reference |
| 008 | User_004 | T_002 | User Data Reference |

| Table 510 | |
|---|---|
| User ID | Partition |
| User_001 | 01 |
| User_002 | 01 |
| User_003 | 02 |
| User_004 | 01 |
| User_005 | 03 |
| User_006 | 03 |
| User_007 | 01 |
| User_008 | 02 |
| User_009 | 04 |
| User_010 | 04 |
| User_011 | 02 |
| User_012 | 02 |

502 (User_002 row)

| 610 | User_001 | |
|---|---|---|
| D1 | D2 | D3 |
| 43 | 12 | 2 |

| 620 | User_002 | |
|---|---|---|
| D1 | D2 | D3 |
| 13 | 0 | 5 |

| 630 | User_003 | |
|---|---|---|
| D1 | D2 | D3 |
| 1 | 20 | 4 |

| 640 | User_004 | |
|---|---|---|
| D1 | D2 | D3 |
| 41 | 12 | 5 |

| 650 | User_005 | |
|---|---|---|
| D1 | D2 | D3 |
| 0 | 0 | 0 |

| 660 | User_006 | |
|---|---|---|
| D1 | D2 | D3 |
| 39 | 13 | 5 |

| 670 | User_007 | |
|---|---|---|
| D1 | D2 | D3 |
| 1 | 12 | 5 |

| 680 | User_008 | |
|---|---|---|
| D1 | D2 | D3 |
| 1 | 0 | 0 |

*FIG. 6*

REBALANCING OF USER ACCOUNTS AMONG PARTITIONS OF A STORAGE SERVICE

CROSS-REFERENCE TO RELATED APPLICATIONS

The present application claims the benefit of U.S. Provisional Application No. 62/651,675, entitled "REBALANCING OF USER ACCOUNTS AMONG PARTITIONS OF A STORAGE SERVICE," filed Apr. 2, 2018, the content of which is incorporated herein by reference in its entirety for all purposes.

FIELD

The described embodiments relate generally to load balancing. More particularly, the present embodiments relate to a technique for rebalancing user accounts among a plurality of partitions of a storage service.

BACKGROUND

Cloud-based services are created and made available over a network such as the Internet for a variety of purposes. Some of these cloud-based services provide access to network-based storage resources such that users can store file or data in the cloud. Typically, a user creates a user account associated with the storage service, and the storage service provides an interface to the user to upload data to be stored on the storage resources. The storage service tracks the amount of data that has been uploaded to the storage service for each user account and can prevent data from being uploaded to the storage service when the amount of data reaches a threshold value (e.g., 5 GB). The user may then be prompted to upgrade the service through a monthly subscription, for example, in order to increase the data limit.

Notably, these storage services provide great value to users, enabling the users to access their data from any device with a connection to the internet. However, the volume of data maintained by the storage service can be difficult to manage. One solution is to divide the data among a number of instances of the storage service. The data can be divided by user accounts, storing data from a first subset of user accounts in a first instance of the storage service and storing data from a second subset of user accounts in a second instance of the storage service. Nevertheless, utilization of the storage resources by different user accounts can vary significantly. Consequently, some instances of the storage service are under-utilized while other instances of the storage service are over-utilized.

Ideally, each instance of the storage service would experience the exact same utilization of resources. If each instance of the storage service is assigned a large number of users, then a simple rebalancing algorithm that randomly hashes user accounts to the various instances of the storage service is trivial to implement. However, such an implementation could require a huge amount of data to be moved every time the user accounts are rebalanced. Moving this amount of data is non-trivial, time consuming, and can lead to disruptions in the storage service. Consequently, alternatives to the simple rebalancing algorithm are desired.

SUMMARY

This paper describes various embodiments that relate to load balancing for a number of partitions of a network-based storage service. Each partition includes a number of server devices and/or network devices located in a data center and configured to provide access to storage resources hosted within the data center. User accounts are assigned to a particular partition such that requests related to a particular user account are routed to that partition. Periodically, a load balancing algorithm is executed to re-assign user accounts to different partitions to rebalance resource consumption across the different partitions. The load balancing algorithm can include generating a vector for each user account that summarizes resource consumption for the user account across multiple resource dimensions or types, sorting the plurality of user accounts into clusters based on the vectors, and mapping at least some user accounts to different partitions.

In some embodiments, resource utilization parameters are determined for each user account. The vectors are then populated with the resource utilization parameters. Resource utilization parameters can include, but are not limited to, storage resource utilization parameters, read I/O utilization parameters, and write I/O utilization parameter. In some embodiments, a value for each storage resource utilization parameter in n resource utilization parameters for a particular user account corresponds with an amount of user data stored in a particular partition of the storage service for a particular tenant in n tenants. A tenant can refer to an application or service storing data for one or more user accounts. Alternatively, a tenant can refer to user data of a particular type or classification exhibiting a particular type of workload out of a plurality of different types of workloads.

In some embodiments, sorting the plurality of user accounts into clusters can include sorting user accounts into a plurality of n-dimensional buckets based on the resource utilization parameters in the vectors. The n-dimensional buckets can include two or more dimensions.

In some embodiments, mapping at least some user accounts to different partitions includes: (1) calculating a number of user accounts associated with each partition in the plurality of partitions included in the n-dimensional bucket; (2) calculating a metric value for each partition in the plurality of partitions included in the n-dimensional bucket; and (3) mapping at least one user account in a partition having a metric value greater than a threshold value to a different partition having a metric value less than the threshold value. In some embodiments, the metric value is a ratio of the number of user accounts included in the partition to an average number of user accounts per partition for the n-dimensional bucket. In such embodiments, the threshold value is 1, such that a partition having a metric value greater than one is a heavy partition and a partition having a metric value less than one is a light partition. User accounts are moved from heavy partitions to light partitions. In some embodiments, a location associated with a user account is considered when determining which light partition to assign a user account.

In some embodiments, sorting user accounts into the plurality of n-dimensional buckets includes: (1) for each resource utilization parameter having a range of values between a minimum value and a maximum value, subdividing the range of values into a number of non-overlapping subranges; (2) associating each n-dimensional bucket with a particular subrange for each resource utilization parameter; and (3) sorting the user accounts into the plurality of n-dimensional buckets based on values for the resource utilization parameters corresponding to each user account. The subdivision of each range of values can be performed such that two conditions are met. A first condition requires that a number of user accounts included in a set of user accounts that correspond with the subrange is less than a first threshold value. A second condition requires that an aggregate resource consumption of the set of user accounts that correspond with the subrange is less than a second threshold value. In some cases, exceptions to meeting the conditions can be acceptable, such as when a subrange cannot be further divided or when a subrange is a minimum size.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 3 illustrates a portion of a distributed database associated with the storage service, in accordance with some embodiments.

FIG. 5 illustrates a database maintaining assignments of user accounts to partitions, in accordance with some embodiments.

FIG. 6 illustrates resource utilization parameters for a plurality of user accounts, in accordance with some embodiments.

DETAILED DESCRIPTION

Figure 1:
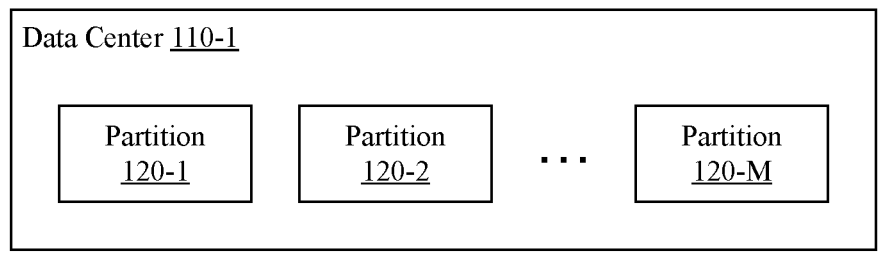
FIG. 1 illustrates a storage service, in accordance with some embodiments.
Figure 1:
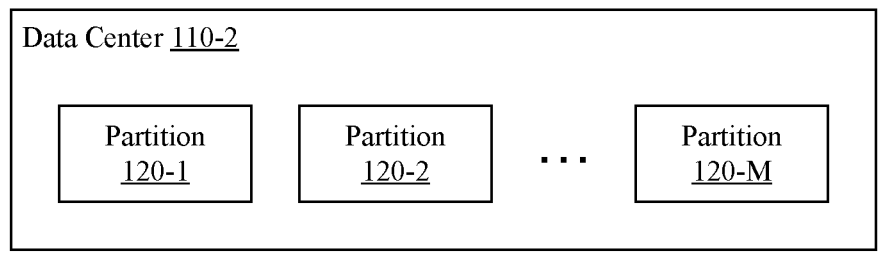
Figure 1:
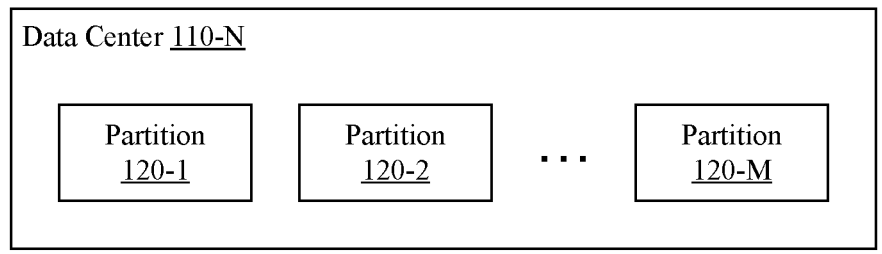

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A storage service provides a virtual drive to a large number of clients associated with a large number of user accounts. The virtual drive can enable clients to store data on network-based storage resources that are remotely located in a number of data centers located throughout the world. The number of user accounts associated with some storage services can number into the billions. For example, each user that purchases a mobile phone can be provided with a user account for a network-based storage service in order to backup the settings of the phone on the storage resources. The storage service can also be used for other purposes like syncing images or videos captured with a device to the cloud, storing documents in a virtual drive accessible from a web-browser, and the like.

The physical embodiment of the storage service, in some instances, is able to handle a large volume of data on a very large number of physical storage devices. Some implementations of the storage service can split the storage service up into separate and distinct instances of the storage service, and then different user accounts are mapped to these different instances, which can be referred to as partitions of the storage service. Given that each partition is likely to be provisioned with the same set of hardware, care needs to be taken to balance the load handled by each partition such that hardware provisioned for some partitions is not under-utilized.

In some embodiments, a rebalancing algorithm is implemented to map the user accounts to the partitions in an effective manner that attempts to balance the load among partitions. Each user account is characterized according to a vector of resource utilization parameters. Given enough parameters, all user accounts with similar values for each parameter can be assumed to behave in a similar manner. All similar user accounts over the entire storage service are then grouped according to a clustering algorithm, and each group of user accounts in a given cluster is balanced across the partitions independently. Thus, each partition can end up including a similar number of user accounts for each cluster of user accounts across a spectrum of differently classified behavioral patterns. Ideally, this will results in a better balance across the partitions than rebalancing based on a single metric, such as total storage space allocated to a particular user account.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates a storage service 100, in accordance with some embodiments. As used herein, a storage service refers to an application, hosted on one or more server devices, that provides access to storage resources available via a network. The storage service 100 is implemented on server devices included in one or more data centers 110. Each data center 110 refers to a facility that hosts server devices and other network infrastructure, such as one or more carrier systems (e.g., Transmission System 1—T1) connecting the data center to one or more telecommunications service provider(s).

As shown in FIG. 1, the storage service 100 can be implemented on N data centers 110, each data center 110 located at a particular geographic location. Although two or more data centers 110 can be hosted at substantially the same geographic location (e.g., within the same facility), data centers 110 are typically strategically located around the world to ensure fast delivery of data between clients and at least one corresponding data center 110.

Each data center 110 can also include one or more partitions 120. Each partition refers to a specific set of hardware that implements a portion of the storage service 100. Although FIG. 1 shows each data center 110 as including M partitions 120 of the storage service 100, it will be appreciated that different data centers 110 can be provisioned with a different number of partitions 120.

In the most simple implementation of the storage service 100, the storage service 100 could be implemented on a single partition 120 located within a single data center 110. However, most implementations of the storage service 100 include a number of partitions 120 located in two or more data centers 110. Such implementations can eliminate a single point of failure (SPOF) from causing downtime for at least some clients through replication. In addition, requests from clients from various locations can be routed to an optimal data center 110 for processing to decrease latency.

Figure 2:
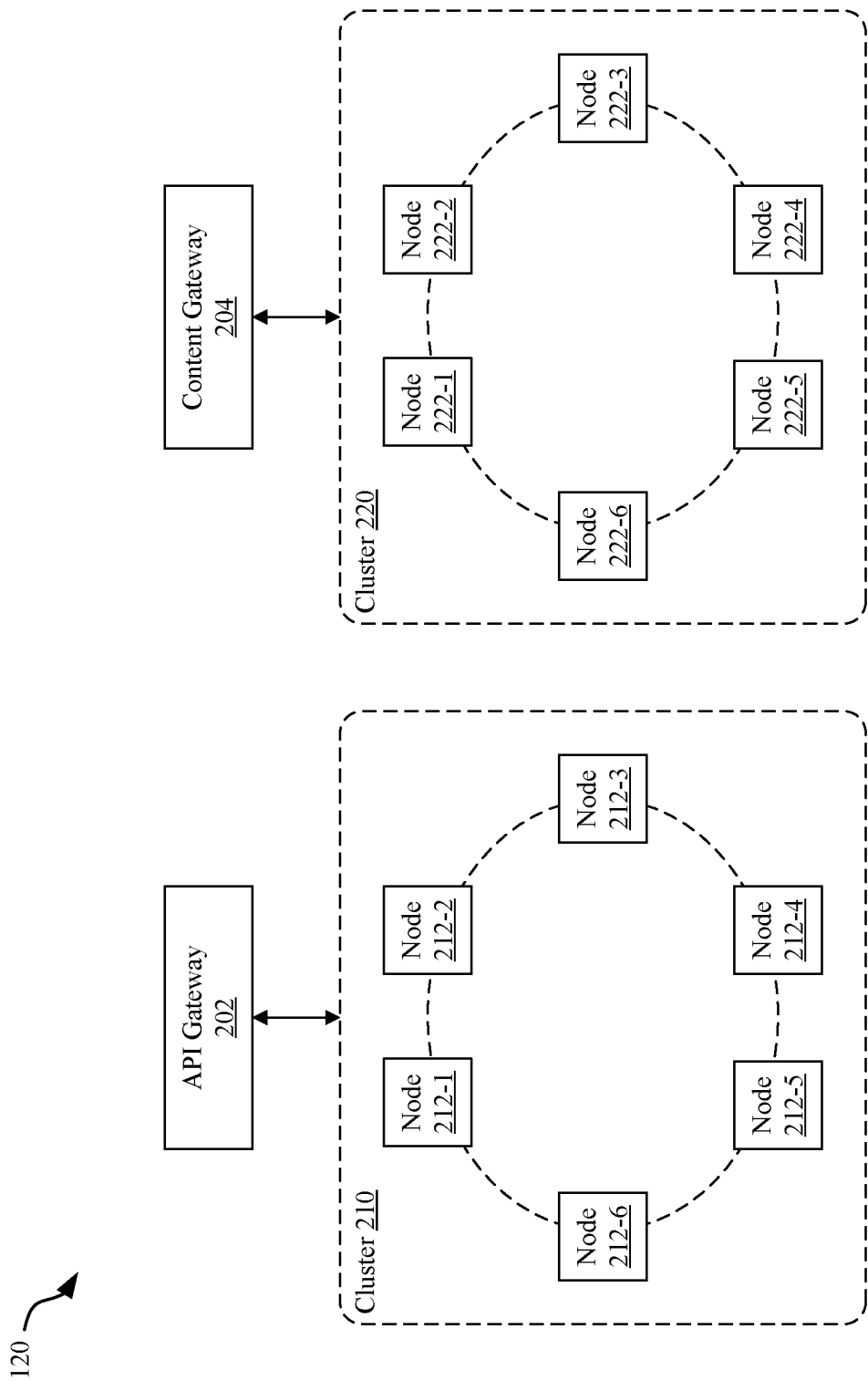
FIG. 2 illustrates a partition of the storage service, in accordance with some embodiments.

FIG. 2 illustrates a partition 120 of the storage service 100, in accordance with some embodiments. The storage service 100 is configured to provide access to network-based storage resources for a plurality of different clients. As used herein, a client refers to a device or application configured to communicate with the storage service 100.

In some embodiments, the partition 120 can include an application programming interface (API) gateway 202 that implements an API that enables clients to communicate with the storage service 100. For example, the storage service 100 can implement an API using a simple object access protocol (SOAP) or a representational state transfer protocol (REST) that enables a client application to access and/or operate on resources associated with the storage service 100. The API can enable the client application to transmit data to and/or receive data from the storage service 100. API calls can also cause the storage service 100 to perform various operations and/or call additional services using additional API calls. It will be appreciated that the storage service 100 can implement one or more APIs according to a variety of different protocols and that the API is not limited to a particular protocol.

In some embodiments, the API gateway 202 is a front-end of the storage service 100. The API gateway 202 can be implemented as an application executing on a server device. The application can be configured to receive data packets from the clients transmitted to one or more ports of a network interface of the server device. The application can also be configured to transmit data packets from one or more ports of the network interface of the server device to network interfaces associated with the clients.

In some embodiments, the API gateway 202 is connected to a cluster 210 of nodes 212. Each node 212 can comprise a server device that includes a processor, volatile memory, a network interface, non-volatile memory, and the like. In some embodiments, each node 212 can comprise a virtual server node, and multiple virtual server nodes can be implemented on a server device, in parallel. For example, each node 212 can comprise a virtual machine (VM), and a hypervisor and a plurality of virtual machines are executed on a single server device. Thus, the number of nodes 212 in the cluster 210 can comprise a number of VMs that is greater than a number of server devices that host the VMs.

Each node 212 in the cluster 210 executes instructions that are configured, when executed by a processor, to process requests associated with the storage service 100 received from one or more clients. The requests can include requests to store data using the storage service 100, access data managed by the storage service 100, delete data stored with the storage service 100, and so forth.

In some embodiments, a node 212 in the cluster 210 processes a request to store data, such as a file, within the storage service 100. The node 212 is configured to request allocation of one or more blocks in a block storage device for storing the data. The node 212 is also configured to create a record in a database that identifies the location of the data within the block storage device. The node 212 can be configured to facilitate the transmission of the data to the one or more allocated blocks within the block storage device. In some cases, the data may be replicated on two or more block storage devices. The node 212 will facilitate such replication, such as by requesting allocation of one or more blocks of data on two or more block storage devices, generating references to the multiple locations of the data within a record in the database, and facilitating the transmission of the data to the two or more block storage devices.

In such embodiments, a content gateway 204 is a front-end of the underlying block storage, receiving requests to store or access data in block storage devices hosted by one or more nodes 222 in the cluster 220. The content gateway 204 routes the request and/or data to a particular node 222, which processes the request. For example, the node 222 can be configured to store data associated with a storage request within a block storage device hosted by the node 222. Alternately, the node 222 can delete data stored on a block storage device hosted by the node 222, transmit data stored on a block storage device hosted by the node 222 to a client, or move data from one block storage device to another block storage device hosted by the same node 222 or a different node 222 in the cluster 220.

In other embodiments, the underlying data is not stored in the partition 120. Instead, the partition 120 stores metadata that references the actual data, which is stored in separate and distinct block storage devices external to the partition 120. For example, the storage service 100 can utilize a number of network-based storage services to store the underlying data uploaded to the storage service 100. The network-based storage service can be provided by the same service provider as the storage service 100 or a different service provider as the service provider of the storage service 100. In some embodiments, multiple network-based storage services are utilized to store underlying data uploaded to the storage service 100.

The data is uploaded to one or more of the network-based storage services, and then metadata associated with the data is stored in a distributed database within the partition 120. The metadata can include a reference to a location of the data in the network-based storage service(s), a size of the data, a time the data was uploaded to the storage service 100, a time the data was last edited, a data format, permissions related to which clients can access the data, and any other relevant information related to the data.

In such embodiments, the content gateway 204 is a front-end for a distributed database, implemented on a cluster 220, that stores metadata related with one or more user accounts associated with the storage service 100.

As used herein, user data refers to any data associated with a user account that is stored within a partition 120. In some embodiments, the user data refers to the actual data uploaded to the storage service 100 as well as any metadata associated therewith. In other embodiments, the user data refers to only the metadata associated with the actual data uploaded to the storage service 100, where the actual data is stored in block storage devices external to the partition 120.

It will be appreciated that the storage service 100 can be utilized by a very large number of users, each user accessing the data stored through the storage service 100 by a number of different client devices. Consequently, the amount of user data stored by the storage service 100 can quickly become very large. In some embodiments, the storage service 100 implements a sharding system to apportion different user accounts to different partitions 120 of the storage service 100. In other words, each partition 120 of the storage service 100 is assigned a different subset of user accounts. User data associated with a particular user account is then stored in a corresponding partition to which the particular user account is assigned, thereby reducing the amount of resources provisioned in each partition 120 to a reasonable or specified level for a particular data center 110 when compared to the resources provisioned to all partitions 120 of the storage service 100 as a whole.

One problem with such a system is that different partitions 120 of the storage service 100 will often have significantly different patterns of resource utilization. Some partitions 120 will store more data than other partitions 120, some partitions 120 will have more accounts than other partitions 120, some partitions 120 will experience higher rates of read or write requests than other partitions 120, and so forth. None of these usage metrics are easily related to other usage metrics and two partitions with similar usage metrics according to one dimension may have vastly varying usage metrics according to another dimension. Therefore, there is a desire to implement a load balancing algorithm within the storage service 100 that attempts to maintain a consistent level of resource utilization across the different partitions 120 of the storage service 100.

FIG. 3 illustrates a portion of a distributed database 300 associated with the storage service 100, in accordance with some embodiments. The storage service 100 can be configured to provide storage resources to a plurality of clients associated with various user accounts. Each request to store data within the storage service 100 includes a user identifier. In some embodiments, the request can also include a tenant identifier.

As used herein, a tenant refers to a particular application or service accessing the storage service 100 from a client. In some embodiments, a tenant is an application that can be installed on a number of clients controlled by a number of different users. For example, a tenant can refer to a photo application installed on a number of client devices. The photo application can be configured to upload data (e.g., image files) to the storage service 100. As another example, a tenant can refer to a fitness tracking application or a health monitoring application. As yet another example, a tenant can refer to a business productivity application that stores backup copies of documents in the storage service. In general, a tenant can refer to any particular application or category of applications (e.g., a number of related photo sharing applications, all word processing applications, etc.) configured to interface with the storage service 100.

In other embodiments, a tenant is a service configured to communicate with the storage service 100. In some cases, a number of clients communicate with the storage service 100 indirectly through the tenant. For example, a tenant can refer to a photo service, hosted on one or more server devices, and configured to interact with photo applications installed on a number of client devices. The photo applications upload data to the photo service, which forwards the data to the storage service 100. Alternately, a tenant can refer to a service that utilizes the storage service 100 for storing data unrelated to one or more clients. For example, a service could generate data as part of an operation that is then stored within the storage service 100. In general, a tenant can refer to any service executed in the background of a client device or implemented on a network and configured to interface with the storage service 100.

In some embodiments, each client device can be associated with a user account. Credentials for the user account can be stored on the client device, and a device identifier associated with the client device can be associated with the user account. For example, a client device can prompt a user to enter credentials for a user account to associate a particular client device with the user account. The same user account can be associated with multiple client devices by entering the credentials on multiple client devices.

Each user account can be permitted to store an amount of data within the storage service 100 up to a threshold value. For example, each user account can be provided with up to 5 GB of storage space on block storage devices through the storage service 100. In some embodiments, different user accounts can be associated with different threshold values. For example, some user accounts can be provided with up to 5 GB of storage space, while other user accounts can be provided with up to 10 GB of storage space.

In some embodiments, each request received by the API gateway 202 of the storage service 100 includes a user identifier 320 corresponding to a particular user account and a tenant identifier 330 corresponding to a particular tenant. Each of the user accounts are assigned to a particular partition 120 of the storage service 100. Consequently, each partition 120 stores metadata 340 in a corresponding portion of the distributed database 300 corresponding to user identifiers 320 associated with user accounts assigned to that partition 120. Thus, a first partition 120-1 of the storage service 100 stores metadata 340 and/or data associated with a first set of user accounts and a second partition 120-2 of the storage service 100 stores metadata 340 and/or data associated with a second set of user accounts.

In some embodiments, the metadata 340 can be stored in the database 300 by adding entries 302 to the database 300. Each entry 302 can include an entry identifier 310 that uniquely identifies the entry within the database 300, a user identifier 320 associated with the entry 302, a tenant identifier 330, optionally, associated with the entry 302, and the metadata 340 for the entry 302. The database 300 can be queried to find all entries 302 associated with a particular user account, a particular tenant, or both a user account and a tenant. In some embodiments, other data can also be included in an entry 302 such as a size of the data referenced by the metadata 340. In other embodiments, the database 300 can store key-value pairs. In such embodiments, the entries 302 can include an entry identifier 310 and a value associated with the entry identifier 310. The value can include a data structure, such as a list of values for a corresponding set of fields or a Javascript Object Notation (JSON) representation of a set of values. The values can include the user identifier 320, the tenant identifier 330, the metadata 340, and/or any additional data related to the data stored in the storage service 100 for a particular user account.

A technique for balancing the load among a plurality of partitions 120 of a storage service 100 is described in more detail below. The load balancing algorithm classifies user accounts based on resource utilization. At least some user accounts are then moved between partitions 120 in order to balance the number of user accounts of each classification among the plurality of partitions 120.

Figure 4:
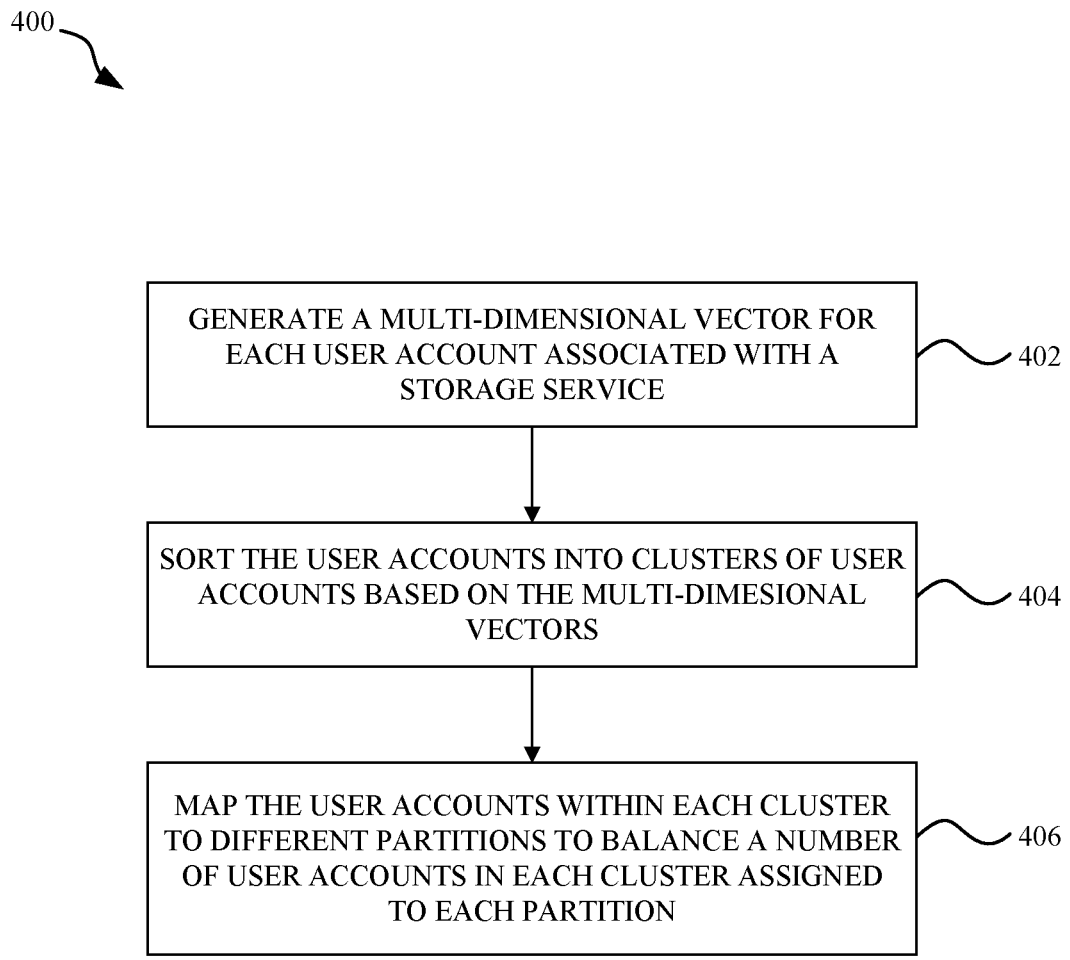
FIG. 4 illustrates a method for rebalancing user accounts among a plurality of partitions of a storage service, in accordance with some embodiments.

FIG. 4 illustrates a method 400 for rebalancing user accounts among a plurality of partitions 120 of a storage service 100, in accordance with some embodiments. The method 400 can be implemented by one or more server devices connected to the partitions 120 of the storage service 100 via a network. In some embodiments, a cluster of server devices is utilized to implement method 400.

A trivial rebalancing algorithm might attempt to rebalance user accounts among the partitions 120 based on a single value used for classification. For example, a storage resource utilization parameter for each user account might classify user accounts by a total amount of storage resource utilized by the user account. The rebalancing algorithm then sorts user accounts among partitions based on this single parameter. However, even if this algorithm is successful at equaling the total storage utilized by all user accounts assigned to each partition 120, the partitions could still be unbalanced according to other measures. For example, user accounts can exhibit vastly different rates of read/write accesses based on how often user data stored within the partitions 120 is accessed by individual users. Consequently, some partitions 120 might experience high levels of access requests, which strains compute resources processing those requests, while other partitions 120 experience very low levels of access requests.

At 402, a vector is generated for each user account associated with a storage service. The vector characterizes a user account based on more than one parameter. Each dimension in the vector represents a different measurement of resource utilization associated with the user account. For example, the vector can include a first dimension for a storage resource utilization parameter, a second dimension for a read I/O utilization parameter, and a third dimension for a write I/O utilization parameter. Other types of dimensions are contemplated as well such as network utilization parameters, access frequency parameters, and so forth. It will be appreciated that any parameters that can distinguish one user account from another user account can be included in the vector.

In some embodiments, the vector includes measurements of the same resource utilization parameters for different tenants. For example, a measurement of the amount of a storage resource utilized by each of a plurality of different tenants can be used to populate different components of the vector.

At 404, the user accounts are sorted into clusters of user accounts based on the vectors. The assumption is that user accounts having the same or similar values within a vector are likely to exhibit similar behaviors. For example, if two separate user accounts have similar utilization of storage resources associated with a photo application tenant, a virtual drive tenant, and a backup service tenant, then those two users are likely to exhibit similar patterns of behavior when storing or accessing user data stored within the storage service 100. From another perspective, a user account that only stores user data for a backup service tenant may be less likely to access that user data than a different user account that stores user data for a photo application tenant simply because a user may look at photos more frequently than restoring a backup of a client device.

The user accounts are clustered according to a clustering algorithm. In some embodiments, a k-means clustering algorithm can be implemented to group user accounts into a number of clusters based on the vectors. The user accounts in each cluster are likely to exhibit similar behavior based on the similarities of the vectors. It will be appreciated that the choice of type and number of resource dimensions included in the vectors can change the effectiveness of the clustering. For example, if the resource utilization parameters included in the vector do not correlate well with user behavior, then the clustering algorithm is not going to be very effective at grouping similar user accounts. In those cases, care can be taken to study the behavioral patterns of user accounts to choose different resource utilization parameters to include in the vector.

In other embodiments, different clustering algorithms can be implemented to group user accounts into a plurality of clusters. For example, user accounts can be grouped to minimize an average distance between vectors in each cluster. In other embodiments, a bucketing algorithm can be implemented to group user accounts into a plurality of pre-defined buckets, where each bucket corresponds to a range of values for each of the resource dimensions.

At step 406, the user accounts within each cluster are mapped to different partitions to balance a number of user accounts in each cluster assigned to each partition 120. Given that all user accounts in a particular cluster are assumed to exhibit similar behavior, the goal of the rebalancing algorithm is to have an even distribution of user accounts among partitions 120 within each cluster rather than over the entire set of user accounts. By achieving this over all clusters, the total behavior of all user accounts in each partition 120 can be relatively similar. In some embodiments, user accounts within a cluster are randomly assigned to the plurality of partitions 120, and user data for each of the user accounts can be moved from an old location to a new location in a newly assigned partition 120.

In other embodiments, the rebalancing algorithm attempts to move the fewest number of user accounts as possible to complete rebalancing. Thus, user accounts from "heavy" partitions will be moved to user accounts in "light" partitions. As used herein, a heavy partition is a partition that has more user accounts, in a particular cluster, than an average number of user accounts per partition for that cluster; and a light partition is a partition that has less user accounts, in a particular cluster, than an average number of user accounts per partition for that cluster. Therefore, only the user data for user accounts in heavy partitions will be moved from a heavy partition to a light partition.

In some embodiments, a choice of which light partition a user account is mapped to is based on a location of the partitions. For example, a user account can be associated with a given location based, at least in part, on geographic information associated with the user account. For example, an IP address associated with requests generated by clients associated with the user account can be mapped to a specific country or region. The geographic information can be used to associate the user account with a location. The user account can then be mapped to one of a number of light partitions based on which light partition is closer to the location associated with the user account. Such considerations may reduce a latency associated with transferring user data between the storage service 100 and the clients.

In other embodiments, a choice of which light partition a user account is mapped to is based on other considerations. Such other considerations can include comparing a location of a heavy partition with a location of available light partitions and mapping the user account to a light partition that is closest to the heavy partition. For example, a user account in a heavy partition can be mapped to a light partition in the same data center as the heavy partition, or within a shortest network distance (e.g., number of hops, ping round-trip response, etc.) of the heavy partition. Other considerations can include comparing a bandwidth of a network link between the heavy partition and available light partitions. For example, a user account in a heavy partition can be mapped to a light partition having the largest bandwidth network link between the heavy partition and the light partition. Different criteria can be selected to balance user location with data transfer considerations (e.g., bandwidth, transfer speed, etc.).

FIG. 5 illustrates a database 500 maintaining assignments of user accounts to partitions 120, in accordance with some embodiments. The database 500 includes a table 510 that associates each user account granted access to the storage service 100 with one of the partitions 120 of the storage service 100. As shown in FIG. 5, the table 510 includes a number of entries 502 that map user identifiers associated with the different user accounts to indexes corresponding to the various partitions 120 in the storage service 100. The table 510 is an assignment map A that associates the user accounts with the plurality of partitions 120 of the storage service 100.

Although the table 510 is shown mapping user identifiers to indexes for the partitions 120, in other embodiments, the table 510 can be implemented to map user identifiers to partition identifiers rather than a simple index. A server device can be configured to query the table 510 in order to identify a partition 120 configured to process a request for a particular user account. In some embodiments, a server device generates the table 510 in order to implement a rebalancing algorithm and the table 510 is not used generally for other operations of the storage service 100.

Although the database 500 is shown as a relational table, it will be appreciated that the database 500 can be implemented as any type of database configured to store key-value pairs. For example, the database 500 can be a NoSQL distributed database implemented on a cluster of server devices.

FIG. 6 illustrates resource utilization parameters for a plurality of user accounts, in accordance with some embodiments. As shown in FIG. 6, a first user account 610 is associated with resource utilization parameters for three resource dimensions (D1, D2, and D3). As an example, the resource dimension D1 represents an amount of metadata stored for a particular user associated with a first tenant; the resource dimension D2 represents an amount of metadata stored for the particular user associated with a second tenant; and the resource dimension D3 represents an amount of metadata stored for the particular user associated with a third tenant. Again, resource dimensions can be related to various statistical measurements associated with the user accounts including, but not limited to, storage space, network bandwidth, number of I/O requests, and the like.

The values for the resource utilization parameters for the first user account 610 are 43, 12, and 2, respectively. Similarly, the values for the resource utilization parameters for a second user account 620 are 13, 0, and 5, respectively. Considering the differences in the values for the three dimensions between the first user account 610 and the second user account 620, it is unlikely that these two user accounts will exhibit similar behavior patterns. The values for the resource utilization parameters for a third user account 630 are 1, 20, and 4, respectively, and the values for the resource utilization parameters for a fourth user account 640 are 41, 12, and 5, respectively. It will be appreciated that the values for the three dimensions in the fourth user account 640 are similar to the values for the three dimensions in the first user account 610. Therefore, it is more likely that these two user accounts will exhibit similar behavior patterns.

The values for the resource utilization parameters for a fifth user account 650 are 0, 0, and 0, respectively, indicating that this user is likely very inactive and may not use the storage service 100 at all. The values for the resource utilization parameters for a sixth user account 660 are 39, 13, and 5, respectively. The values for the resource utilization parameters for a seventh user account 670 are 1, 12, and 5, respectively, and the values for the resource utilization parameters for an eighth user account 680 are 1, 0, and 0, respectively.

Figure 7:
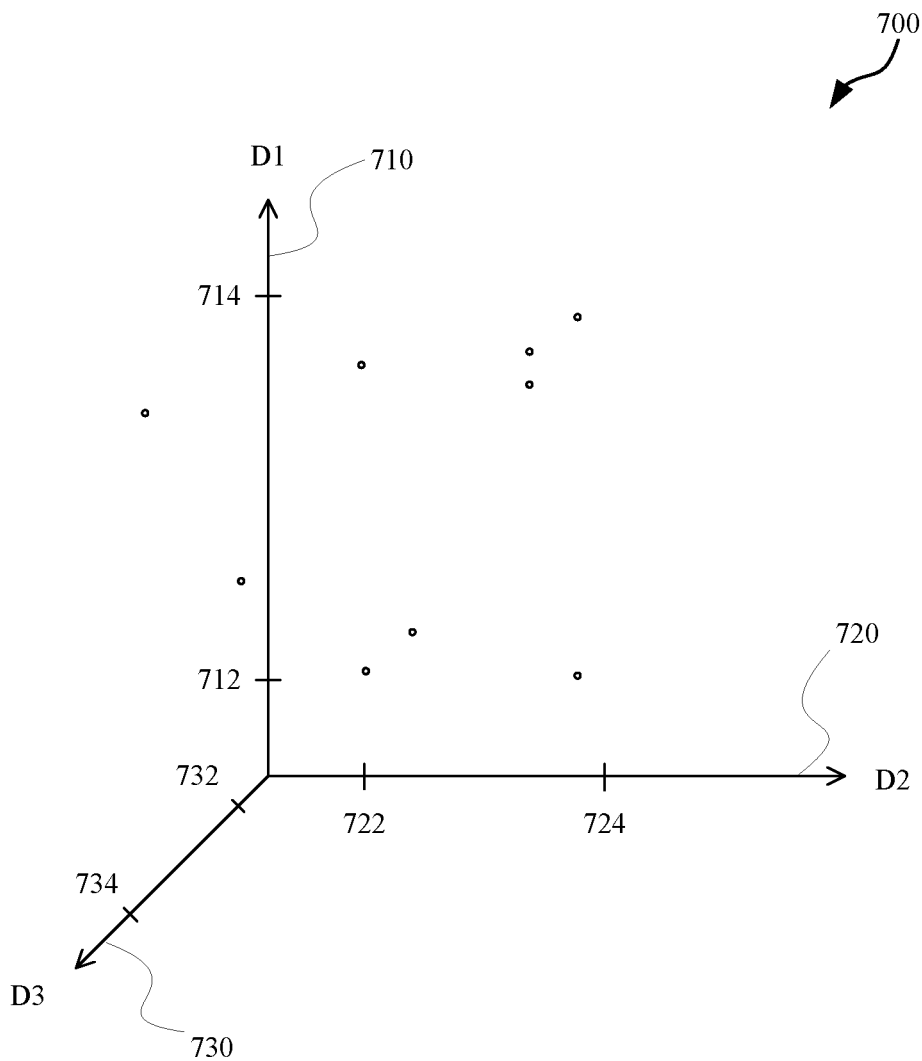
FIG. 7 is a visualization of a three-dimensional space associated with a vector, in accordance with some embodiments.

FIG. 7 is a visualization of a three-dimensional space 700 associated with a vector, in accordance with some embodiments. Points are plotted in the three-dimensional space 700, the points representing the different coordinates of the vectors for a plurality of user accounts.

As shown, the three-dimensional space 700 has three orthogonal axes. A first axis 710 represents the values for a first resource dimension of the vector. All of the points fall within a minimum value 712 and a maximum value 714 of the first dimension, D1. For example, as shown in FIG. 6, the minimum value of the first dimension, D1, of the eight user accounts (610 et seq.) is 0 and the maximum value of the first dimension, D1, of the eight user accounts is 43. A second axis 720 represents the values for a second dimension of the vector. All of the points fall within a minimum value 722 and a maximum value 724 of the second dimension, D2. For example, as shown in FIG. 6, the minimum value of the second dimension, D2, of the eight user accounts (610 et seq.) is 0 and the maximum value of the second dimension, D2, of the eight user accounts is 20. A third axis 730 represents the values for a third dimension of the vector. All of the points fall within a minimum value 732 and a maximum value 734 of the third dimension, D3. For example, as shown in FIG. 6, the minimum value of the third dimension, D3, of the eight user accounts (610 et seq.) is 0 and the maximum value of the third dimension, D3, of the eight user accounts is 5.

The three-dimensional space 700 helps visualize how user accounts are clustered according to their associated vectors. It will be appreciated that the vector can include as few as two dimensions representing two resource utilization parameters, in which case the points can be plotted in a two-dimensional plane. In some embodiments, the vector can include four or more dimensions representing additional resource utilization parameters and, as such, a visualization of the coordinates for such vectors is difficult, conceptually.

Figure 8:
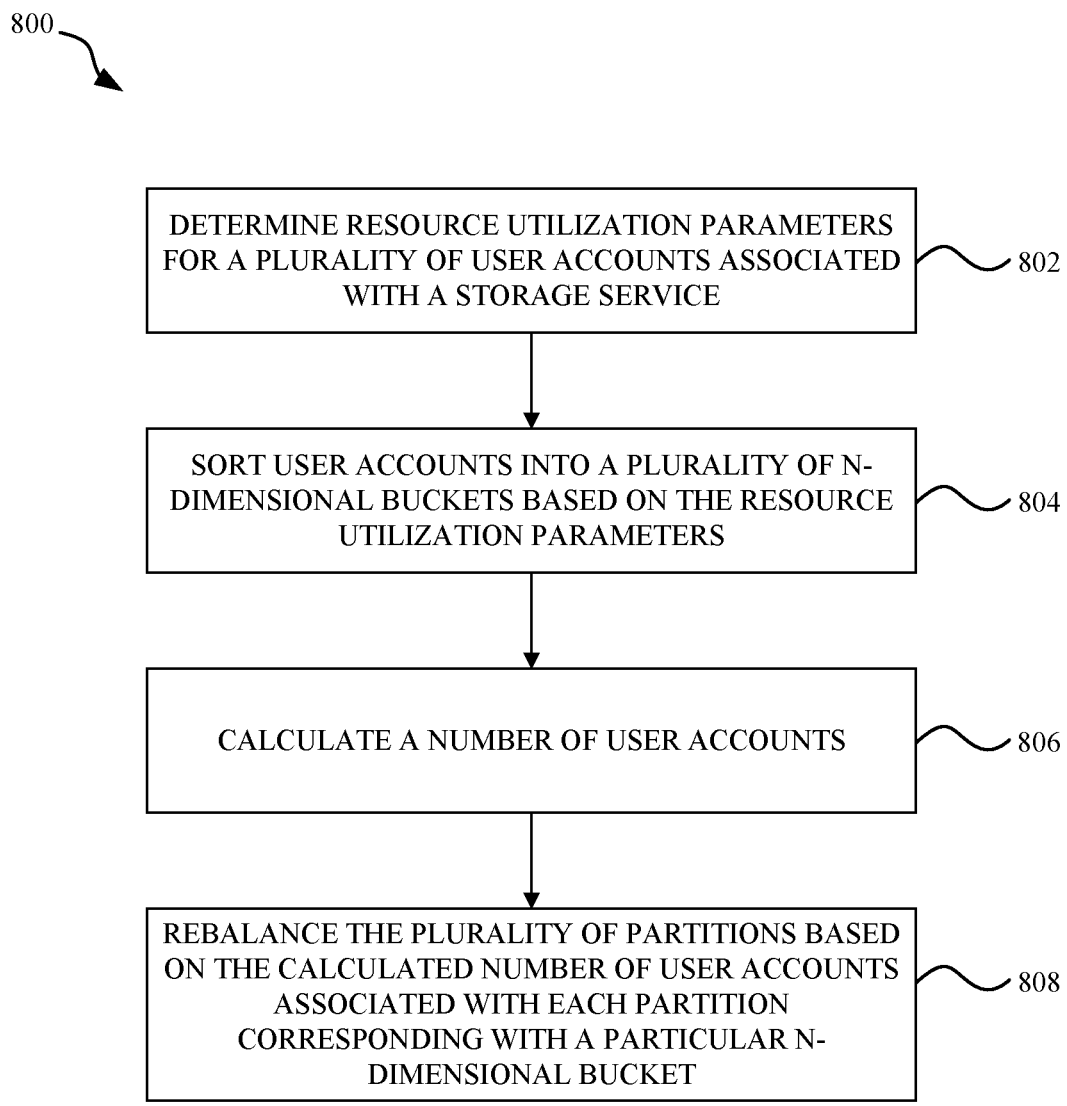
FIG. 8 illustrates a method for rebalancing user accounts among a plurality of partitions of a storage service, in accordance with some embodiments.

FIG. 8 illustrates a method 800 for rebalancing user accounts among a plurality of partitions 120 of a storage service 100, in accordance with some embodiments. The method 800 can be implemented by one or more server devices connected to the partitions 120 of the storage service 100 via a network. In some embodiments, a cluster of server devices is utilized to implement method 800.

One particular embodiment of the method 400 implements a specific clustering algorithm in order to group user accounts associated with vectors of resource utilization parameters. The specific clustering algorithm utilizes a bucketing algorithm, as described below, where user accounts are sorted into n-dimensional buckets based on subdivisions of a range of values corresponding to each resource dimension in the vectors for all user accounts.

At 802, resource utilization parameters are determined for a plurality of user accounts associated with the storage service. In some embodiments, a server device queries a partition 120 to determine a value for a plurality of resource utilization parameters for each user account. The partition 120 can determine a value for each resource utilization parameter and return the values to the server device for each user account. For example, the resource utilization parameters can include: an amount of user data stored in the partition 120 for the particular user account (e.g., 4.3 GB); a number of read I/O requests received in a particular time frame (e.g., the last day, week, month, etc.); a number of write I/O requests received in a particular time frame; a network bandwidth consumed in a particular time frame; and so forth.

In some embodiments, a separate value corresponding to each tenant in a plurality of tenants for each of a number of resource utilization parameters is determined for each user account. A value for a storage resource utilization parameter can be determined for each of two or more tenants, the separate and distinct values representing an amount of user data stored in the partition 120 by each of the two or more tenants. For example, a first value can reflect an amount of user data associated with a backup service tenant, a second value can reflect an amount of user data associated with a virtual drive tenant, and a third value can reflect an amount of user data associated with a photo application tenant.

In some embodiments, the values reflect the actual value of a resource utilization measurement. For example, a storage resource utilization value or a bandwidth resource utilization parameter can be provided as a number of bytes or, alternately, a number of kilobytes, megabytes, or gigabytes, depending on the level of precision required. As another example, a read I/O utilization parameter or a write I/O utilization parameter can be provided as a number of requests per time period.

In other embodiments, the values reflect normalized values related to the resource utilization measurement. For example, the values can be mapped to a fixed range such as [0.0, 1.0] that represent a relative position of the actual value within the range [$RUM_{min}$, $RUM_{max}$], where $RUM_{min}$ is a minimum resource utilization measurement value and $RUM_{max}$ is a maximum resource utilization measurement value. In some embodiments, the normalization maps a linear scale to a logarithmic scale. For example, where a resource utilization parameter among a plurality of user accounts is similar to a wealth distribution curve, it may be helpful to normalize the measurement to a logarithmic scale such that a distance measurement between two points is skewed based on the relative position within the linear scale.

In some embodiments, the partition 120 can track the resource utilization parameters for each account. As each request to access a resource is received, the partition 120 can adjust a value for a corresponding resource utilization parameter. For example, as a request to store user data within a partition 120 is received, the partition 120 can update a value in a database that tracks an amount of user data stored in the partition 120 for a corresponding user account and a corresponding tenant based on a user identifier 320 and a tenant identifier 330 included in the request. In some embodiments, each user account is associated with a separate table that associates a given tenant with a total amount of user data stored for that tenant. For example, the table can include an entry for a photo application tenant that indicates a total amount of user data associated with photos. The table can include another entry for a backup service tenant that indicates a total amount of user data associated with backups of client devices.

At 804, user accounts are sorted into a plurality of n-dimensional buckets based on the values of resource utilization parameters in a vector associated with each user account. In some embodiments, for each resource utilization parameter having a range of values between a minimum value and a maximum value, the range of values is subdivided into a number of non-overlapping subranges, where each n-dimensional bucket is defined by a choice of one sub-range for each resource dimension of the vector.

For example, when at least some user accounts store 0 MBs of user data in the partition and another user account stores 120 MB of user data in the partition, which is the maximum amount of user data stored for any user account in the partition, the range of values is [0 MB, 120 MB]. This range can be subdivided into M substantially equal subranges such as [0 MB, 60 MB] and (60 MB, 120 MB] when M equals 2, or [0 MB, 40 MB], (40 MB, 80 MB], and (80 MB, 120 MB] when M equals 3. In some embodiments, the subranges can be of disparate size. For example, when the distribution of user accounts within the range is skewed, subranges towards the minimum or maximum value may shrink or expand such that the distribution of user accounts corresponding to particular subranges is not excessively disproportionate. As one example, when most user accounts have less than 5 MB of user data stored in the partition 120 and a small number of user accounts have greater than 50 MB of user data stored in the partition 120, the subranges closer to the minimum value can be smaller (e.g., 1 MB wide) whereas the subranges closer to the maximum value can be larger (e.g., 20 MB wide) to reflect that more user accounts will be concentrated towards the bottom of the range.

In some embodiments, the subdividing is performed such that, for each subrange, a number of user accounts included in a set of user accounts that correspond with the subrange is less than a first threshold value and an aggregate resource consumption of the set of user accounts that correspond with the subrange is less than a second threshold value. As subdivisions are selected, a set of user accounts that correspond with the subrange can be determined by finding all user accounts that have a value for that particular resource utilization parameter that falls in the subrange.

One condition for subdivision can require that, at most, k % of user accounts correspond to a particular subrange. A first threshold value can be calculated by multiplying k % by a total number of user accounts to determine a maximum number of user accounts that can correspond to the subrange. If a number of user accounts that correspond to the particular subrange is greater than the first threshold value, then the subrange is further subdivided. In some cases, there may be an exception for this condition if the subrange is of minimum size. For example, if the subrange is at the low end of a range of values, and a large number of users have a value for this particular resource utilization parameter that matches the minimum value, then it may not be possible for the subrange to be shrunk such that less than k % of all user accounts fall within the subrange.

Another condition for subdivision can require that, at most, r % of the total resource consumption, across all user accounts, corresponds to a particular subrange. A second threshold value can be calculated by multiplying r % by a total resource consumption to determine a maximum resource consumption that can correspond to the subrange. An aggregate resource consumption can be calculated by summing the resource consumption for all user accounts corresponding to the subrange. If the aggregate resource consumption is greater than the second threshold value, then the subrange is further subdivided.

In some embodiments, a plurality of n-dimensional buckets are defined. Each dimension in the n dimensions corresponds to a particular resource utilization parameter in the vector. Consequently, each n-dimensional bucket is associated with a particular subrange for each of the n resource utilization parameters. The user accounts are then sorted into the plurality of n-dimensional buckets based on values for the resource utilization parameters corresponding to each user account.

An n-dimensional index can be calculated for each user account that points to a specific n-dimensional bucket in a set of buckets B. For example, when n is equal to three, a 3-dimensional index (i, j, k) that points into B[i][j][k] can be calculated where index i corresponds to a particular subrange of a first resource utilization parameter, index j corresponds to a particular subrange of a second resource utilization parameter, and index k corresponds to a particular subrange of a third resource utilization parameter. The number of n-dimensional buckets is equal to a number of subranges of the first resource utilization parameter, multiplied by a number of subranges of the second resource utilization parameter, multiplied by a number of subranges of the third resource utilization parameter.

At 806, a number of user accounts associated with each partition in the plurality of partitions is calculated for each n-dimensional bucket. It will be appreciated that the sorting of user accounts into the plurality of n-dimensional buckets is performed for all user accounts across all partitions 120 such that user accounts in different partitions 120 can be sorted into the same bucket. Consequently, the number of user accounts currently associated with each partition 120 is calculated for each n-dimensional bucket.

In some embodiments, a server device can access a mapping table A of assignments of user accounts to the plurality of partitions 120 of the storage service 100. The server device then counts the number of user accounts in each n-dimensional bucket associated with each of the plurality of partitions 120.

At 808, the plurality of partitions is rebalanced based on the calculated number of user accounts associated with each partition. In some embodiments, an average number of user accounts per partition, is calculated for each n-dimensional bucket. For example, a number of user accounts in an n-dimensional bucket is divided by a total number of partitions 120 implemented within the storage service 100 to determine the average number of user accounts per partition. The user accounts can then be moved between partitions, selectively, to rebalance the plurality of partitions.

In some embodiments, a minimum number of user accounts is moved between partitions 120 in order to help alleviate the imbalance, but not completely correct the imbalance. Rebalancing can be performed periodically, ideally in a way that is minimally invasive to the storage service 100. Consequently, the number of user accounts that can be moved in order to rebalance the plurality of partitions can be minimized.

In some embodiments, the n-dimensional buckets are sorted according to a heuristic associated with each n-dimensional bucket. In some embodiments, a heuristic value is calculated for each n-dimensional bucket. The heuristic value represents a priority of which n-dimensional buckets can be rebalanced first in order to have the largest overall effect on the balance of resource consumption across the partitions 120. The heuristic value can be calculated in various ways, but, in some embodiments, the heuristic value is calculated as shown in FIG. 9.

Figure 9:
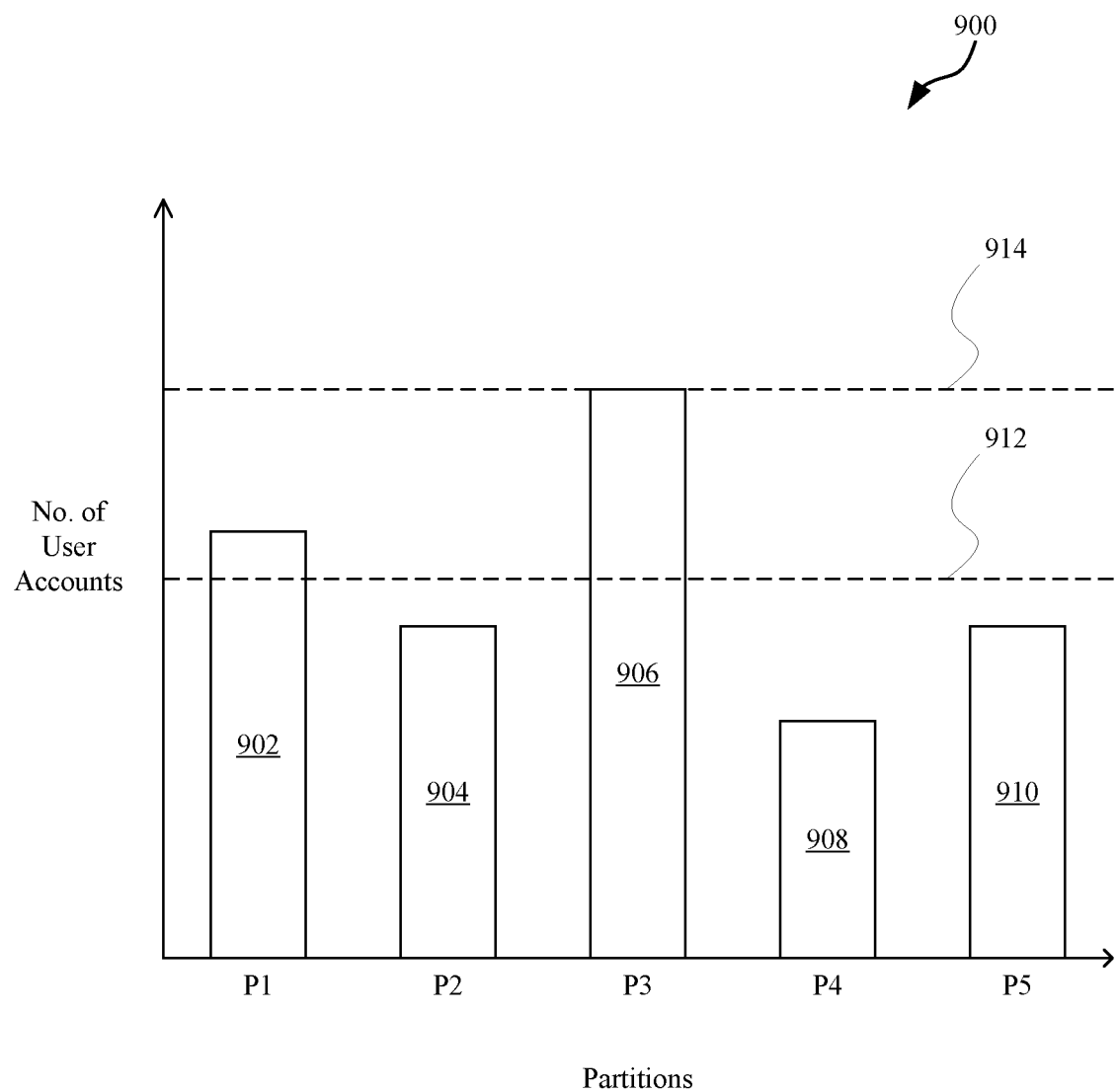
FIG. 9 illustrates a chart that shows a number of user accounts for each partition of an n-dimensional bucket, in accordance with some embodiments.

FIG. 9 illustrates a chart 900 that shows a number of user accounts for each partition 120 of an n-dimensional bucket, in accordance with some embodiments. In some embodiments, the heuristic value is calculated by taking a ratio of a maximum number of user accounts for any partition 120 in the n-dimensional bucket to an average number of user accounts per partition for the n-dimensional bucket. A first bar 902 reflects a number of user accounts included in a first partition, P1, a second bar 904 reflects a number of user accounts included in a second partition, P2, a third bar 906 reflects a number of user accounts included in a third partition, P3, a fourth bar 908 reflects a number of user accounts included in a fourth partition, P4, and a fifth bar 910 reflects a number of user accounts included in a fifth partition, P5. The total number of user accounts within the n-dimensional bucket can be calculated by summing the number of user accounts in each partition as shown in the chart 900.

As shown in FIG. 9, an average number of user accounts 912 associated with a given partition within the n-dimensional bucket can be calculated by dividing the total number of user accounts within the n-dimensional bucket by a number of partitions 120 (e.g., 5 as shown in FIG. 9). Then, a metric value for each partition can be calculated by determining a ratio of the number of user accounts for a particular partition to the average number of user accounts 912. Partitions 120 where the metric value is less than 1 are light partitions and partitions 120 where the metric value is greater than 1 are heavy partitions. A maximum metric value for all partitions 120 in the n-dimensional bucket can be selected as the heuristic value for the n-dimensional bucket. As shown in FIG. 9, the heuristic value is given by a metric value for a third partition, P3, which is the ratio of a number of user accounts associated with the third partition 914 to the average number of user accounts 912.

In some embodiments, rebalancing is only performed when the heuristic value for any n-dimensional buckets are above a threshold value. In an exemplary embodiment, the threshold value may be set to, e.g., 1.3. Thus, rebalancing is only performed when a particular partition 120 includes more than 30 percent more user accounts than the average number of user accounts. In other embodiments, a minimum metric value for all partitions 120 in the n-dimensional bucket can be selected as the heuristic value for the n-dimensional bucket, and rebalancing can be performed when a metric value for any partition 120 is below a second threshold value (e.g., when the ratio is less than 0.7), which could occur when new partitions 120 are added to the storage service 100. In yet other embodiments, a maximum metric value for all partitions 120 in the n-dimensional bucket can be selected as a first heuristic value for the n-dimensional bucket, and a minimum metric value for all partitions 120 in the n-dimensional bucket can be selected as a second heuristic value for the n-dimensional bucket. Rebalancing can be performed when either the first heuristic value or the second heuristic value falls outside of a predefined range.

In some embodiments, rebalancing is only performed to an extent where the ratio is adjusted below a second threshold value. For example, when an average number of user accounts is 600 and the maximum number of user accounts in a partition 120 is 1000, 400 user accounts would need to be moved out of the partition 120 to achieve a perfect balance with other partitions 120. However, moving this much data could be disruptive and, as such, maybe only 300 user accounts are moved such that the ratio for the partition 120 is changed from 1.66 to 1.17 bringing the ratio under a second threshold value of 1.2. Instead of attempting to achieve perfect balance within each n-dimensional bucket, each n-dimensional bucket is only corrected to be within some threshold of perfect balance, which allows the resources used to move data between partitions to be more effective at rebalancing resource load to focus corrective measures on the heaviest partitions.

Figure 10:
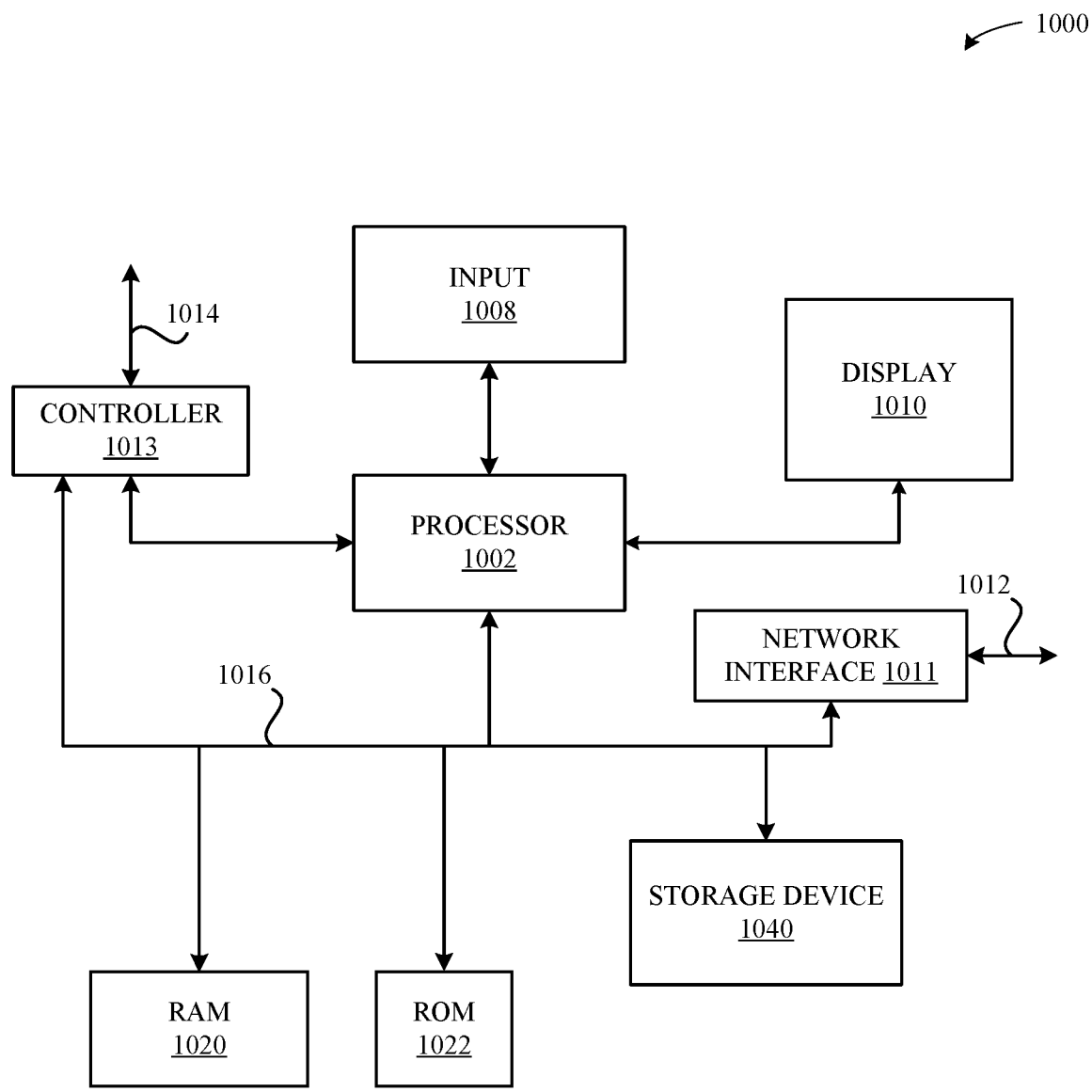
FIG. 10 illustrates a detailed view of an exemplary computing device that can be used to implement the various apparatus and/or methods described herein, in accordance with some embodiments.

FIG. 10 illustrates a detailed view of an exemplary computing device 1000 that can be used to implement the various apparatus and/or methods described herein, in accordance with some embodiments. In particular, the detailed view illustrates various components that can be included in the computing devices illustrated in FIGS. 1-9 and/or described herein. For example, one or more of the API gateway 202, content gateway 204, or server nodes within the cluster 210 or cluster 220, or any other device including any network devices and/or server devices can include the components of computing device 1000.

As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touchscreen, audio input interface, visual/image capture input interface, input in the form of sensor data, etc. Still further, the computing device 1000 can include a display 1010 (screen display) that can be controlled by the processor 1002 to present visual information to the user. A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include a wireless transceiver.

The computing device 1000 also includes a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000.

As described above, one aspect of the present technology is the gathering and use of data available from various sources to load balance partitions of a storage service. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to move user data to a different partition that improves the response time of the storage service for the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, rebalancing of the partitions of the storage service can be performed based on non-personal information data or a bare minimum amount of personal information, such as the content being requested by the device associated with a user, other non-personal information available to the rebalancing algorithm, or publicly available information.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for balancing resource utilization among a plurality of partitions of a storage service, the method comprising:
    establishing a plurality of user account clusters;
    for each user account of a plurality of user accounts associated with the storage service:
        generating a respective vector for the user account by populating the respective vector with resource utilization parameters for the user account, wherein:
            the respective vector includes, for each tenant of a plurality of tenants associated with the storage service, a respective dimension that stores at least one value that is representative of interactions that take place between the user account and the tenant, and
            each tenant of the plurality of tenants is a respective service that is implemented within the storage service;
        sorting, based on the respective vector, the user account into a particular user account cluster of the plurality of user account clusters; and
    for each user account cluster of the plurality of user account clusters:
        mapping each user account in the user account cluster into a respective one of the partitions of the plurality of partitions of the storage service.

2. The method of claim 1, wherein generating the respective vector for a given user account of the plurality of user accounts further comprises, prior to populating the respective vector with the resource utilization parameters for the give n user account:
    identifying the resource utilization parameters for the given user account.

3. The method of claim 1, wherein the sorting comprises:
    sorting each user account of the plurality of user accounts into a respective n-dimensional bucket based on the resource utilization parameters in the respective vector.

4. The method of claim 3, wherein the n-dimensional buckets are at least two-dimensional.

5. The method of claim 3, wherein mapping the user accounts comprises, for each n-dimensional bucket:
    calculating a number of user accounts associated with each partition in the plurality of partitions included in the n-dimensional bucket;
    calculating a metric value for each partition in the plurality of partitions included in the n-dimensional bucket; and
    mapping at least one user account in a partition having a metric value greater than a threshold value to a different partition having a metric value less than the threshold value.

6. The method of claim 5, wherein:
    the metric value comprises a ratio of the number of user accounts included in the partition to an average number of user accounts per partition for the n-dimensional bucket, and
    the threshold value is 1.

7. The method of claim 3, wherein sorting user accounts into the n-dimensional buckets based on the resource utilization parameters comprises:
    for each resource utilization parameter having a range of values between a minimum value and a maximum value, subdividing the range of values into a number of non-overlapping subranges such that, for each subrange, a number of user accounts included in a set of user accounts that correspond with the subrange is less than a first threshold value and an aggregate resource consumption of the set of user accounts that correspond with the subrange is less than a second threshold value;
    associating each n-dimensional bucket with a particular subrange for each resource utilization parameter; and
    sorting the user accounts into the n-dimensional buckets based on values for the resource utilization parameters corresponding to each user account.

8. The method of claim 2, wherein the resource utilization parameters comprise one or more of:
    a storage resource utilization parameter;
    a read I/O utilization parameter; and
    a write I/O utilization parameter.

9. The method of claim 2, wherein determining resource utilization parameters for the user account comprises:
determining a storage resource utilization parameter for each tenant of the plurality of tenants associated with the user account.

10. The method of claim 9, wherein a value for each storage resource utilization parameter in n resource utilization parameters for a particular user account corresponds with an amount of data stored in a particular partition of the storage service for a particular tenant in n tenants.

11. At least one non-transitory computer-readable medium storing computer instructions that, when executed by at least one processor included in a computing device, cause the computing device to balance resource utilization among a plurality of partitions of a storage service, by carrying out steps that include:
establishing a plurality of user account clusters;
for each user account of a plurality of user accounts associated with the storage service:
generating a respective vector for the user account by populating the respective vector with resource utilization parameters for the user account,
wherein:
the respective vector includes, for each tenant of a plurality of tenants associated with the storage service, a respective dimension that stores at least one value that is representative of interactions that take place between the user account and the tenant, and
each tenant of the plurality of tenants is a respective service that is implemented within the storage service;
sorting, based on the respective vector, the user account into a particular user account cluster of the plurality of user account clusters; and
for each user account cluster of the plurality of user account clusters:
mapping each user account in the user account cluster into a respective one of the partitions of the plurality of partitions of the storage service.

12. The at least one non-transitory computer-readable medium of claim 11, wherein generating the respective vector for a given user account of the plurality of user accounts further comprises, prior to populating the respective vector with the resource utilization parameters for the given user account:
identifying the resource utilization parameters for the given user account.

13. The at least one non-transitory computer-readable medium of claim 11, wherein the sorting comprises:
sorting each user account of the plurality of user accounts into a respective n-dimensional bucket based on the resource utilization parameters in the respective vector.

14. A computing device configured to balance resource utilization among a plurality of partitions of a storage service, the computing device comprising:
at least one processor; and
at least one memory storing instructions that, when executed by the at least one processor, cause the computing device to carry out steps that include:
establishing a plurality of user account clusters;
for each user account of a plurality of user accounts associated with the storage service:
generating a respective vector for the user account by populating the respective vector with resource utilization parameters for the user account,
wherein:
the respective vector includes, for each tenant of a plurality of tenants associated with the storage service, a respective dimension that stores at least one value that is representative of interactions that take place between the user account and the tenant, and
each tenant of the plurality of tenants is a respective service that is implemented within the storage service;
sorting, based on the respective vector, the user account into a particular user account cluster of the plurality of user account clusters; and
for each user account cluster of the plurality of user account clusters:
mapping each user account in the user account cluster into a respective one of the partitions of the plurality of partitions of the storage service.

15. The computing device of claim 14, wherein generating the respective vector for a given user account of the plurality of user accounts further comprises, prior to populating the respective vector with the resource utilization parameters for the given user account:
identifying the resource utilization parameters for the given user account.

16. The computing device of claim 14, wherein the sorting comprises:
sorting each user account of the plurality of user accounts into a respective n-dimensional bucket based on the resource utilization parameters in the respective vector.

17. The computing device of claim 16, wherein the n-dimensional buckets are at least two-dimensional.

18. The computing device of claim 16, wherein mapping the user accounts comprises, for each n-dimensional bucket:
calculating a number of user accounts associated with each partition in the plurality of partitions included in the n-dimensional bucket;
calculating a metric value for each partition in the plurality of partitions included in the n-dimensional bucket; and
mapping at least one user account in a partition having a metric value greater than a threshold value to a different partition having a metric value less than the threshold value.

19. The computing device of claim 18, wherein:
the metric value comprises a ratio of the number of user accounts included in the partition to an average number of user accounts per partition for the n-dimensional bucket, and
the threshold value is 1.

20. The computing device of claim 16, wherein sorting user accounts into the n-dimensional buckets based on the resource utilization parameters comprises:
for each resource utilization parameter having a range of values between a minimum value and a maximum value, subdividing the range of values into a number of non-overlapping subranges such that, for each subrange, a number of user accounts included in a set of user accounts that correspond with the subrange is less than a first threshold value and an aggregate resource consumption of the set of user accounts that correspond with the subrange is less than a second threshold value;
associating each n-dimensional bucket with a particular subrange for each resource utilization parameter; and
sorting the user accounts into the n-dimensional buckets based on values for the resource utilization parameters corresponding to each user account.

* * * * *

UNITED STATES PATENT AND TRADEMARK OFFICE
CERTIFICATE OF CORRECTION

| | |
|---|---|
| PATENT NO. | : 11,442,632 B2 |
| APPLICATION NO. | : 16/137372 |
| DATED | : September 13, 2022 |
| INVENTOR(S) | : Nicolas A. Favre-Felix et al. |

It is certified that error appears in the above-identified patent and that said Letters Patent is hereby corrected as shown below:

In the Claims

In Claim 2, at Column 20, Line 19: "give n user account:" should read -- given user account: --.

Signed and Sealed this
Twelfth Day of September, 2023

*Katherine Kelly Vidal*

Katherine Kelly Vidal
*Director of the United States Patent and Trademark Office*